United States Patent [19]

Capper et al.

[11] Patent Number: 5,288,078
[45] Date of Patent: Feb. 22, 1994

[54] CONTROL INTERFACE APPARATUS

[75] Inventors: David G. Capper, 49 Edwards Ave., Sausalito, Calif. 94965; Stan Axelrod, Foret Knolls, Calif.

[73] Assignee: David G. Capper, Sausalito, Calif.; a part interest

[21] Appl. No.: 914,640

[22] Filed: Jul. 16, 1992

Related U.S. Application Data

[63] Continuation of Ser. No. 258,157, Oct. 14, 1988, abandoned.

[51] Int. Cl.⁵ .................. A63F 9/22; G09G 5/00
[52] U.S. Cl. .................. 273/148 B; 273/438; 345/156
[58] Field of Search .......... 340/706, 709, 710, 712; 178/18, 19; 273/148 B, 85 G, 434, 438, 311, 312, 358, 460, 316, DIG. 28; 250/201, 206, 208, 209, 216, 221, 573, 574, 578

[56] References Cited

U.S. PATENT DOCUMENTS

| | | | |
|---|---|---|---|
| 3,886,361 | 5/1975 | Wester | 250/221 |
| 4,111,421 | 9/1978 | Mierzwinski | 273/85 G |
| 4,137,651 | 2/1979 | Pardes et al. | 273/312 |
| 4,210,329 | 7/1980 | Steiger et al. | 273/312 |
| 4,521,772 | 6/1985 | Lyon | 340/710 |
| 4,521,870 | 6/1985 | Babbel et al. | 340/709 |
| 4,524,348 | 6/1985 | Lefkowitz | 340/706 |
| 4,545,583 | 10/1985 | Pearman et al. | 273/311 |
| 4,550,250 | 10/1985 | Mueller et al. | 340/710 |
| 4,565,999 | 1/1986 | King et al. | 340/706 |
| 4,695,953 | 9/1987 | Blair et al. | 273/85 G |
| 4,713,545 | 12/1987 | Norrgren et al. | 250/221 |
| 4,771,344 | 9/1988 | Fallacaro et al. | 273/460 |
| 4,791,416 | 12/1988 | Adler | 340/712 |
| 4,796,019 | 1/1989 | Auerbach | 340/712 |
| 4,799,687 | 1/1989 | Davis et al. | 273/358 |
| 4,910,464 | 3/1990 | Trett et al. | 250/221 |
| 4,924,216 | 5/1990 | Leung | 340/709 |

Primary Examiner—Richard Hjerpe
Attorney, Agent, or Firm—Kolisch, Hartwell, Dickinson, McCormack & Heuser

[57] ABSTRACT

This invention comprises a control interface between a machine and a physical object. The invention includes an infrared transmitter for transmitting a first infrared signal to an object. Upon striking the object, the infrared signal is reflected forming a reflected infrared signal. An infrared receiver receives the reflected signal from the object and the reflected signal is transformed into a second signal which may be either an analogue type or a yes/no threshold type, representative of a distance between the object and the receiver. The second signal is coupled to the machine. The apparatus is a cordless touch-free controller interface for use with a machine. The present invention is ideally suited for controlling cursor position for use with computers and also with video games.

13 Claims, 9 Drawing Sheets

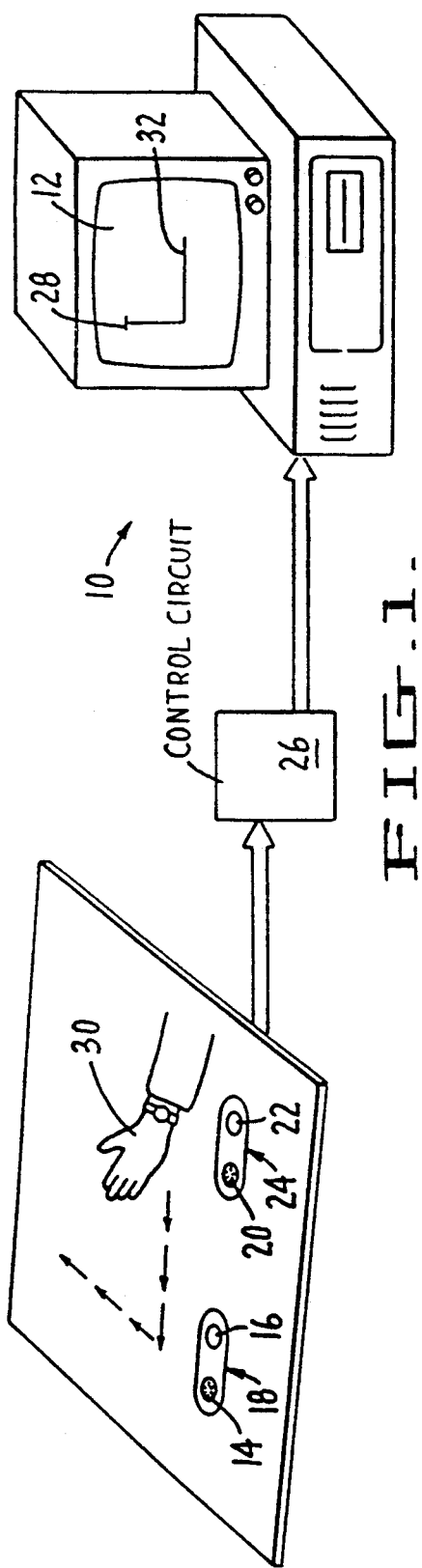
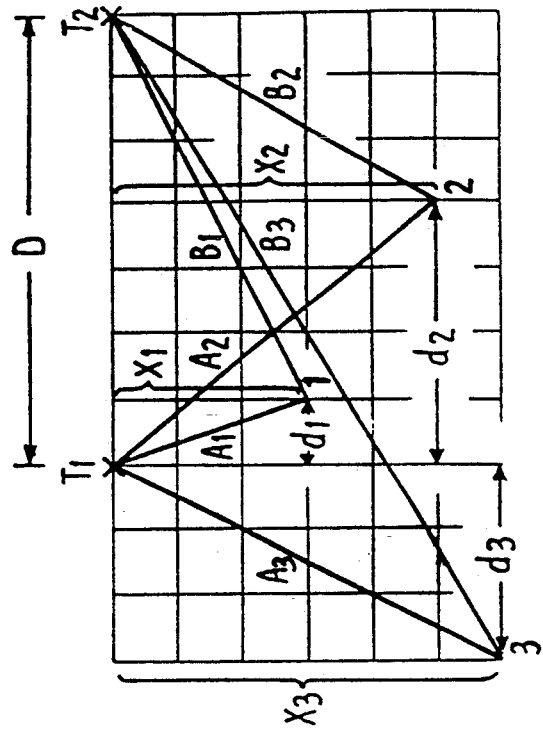
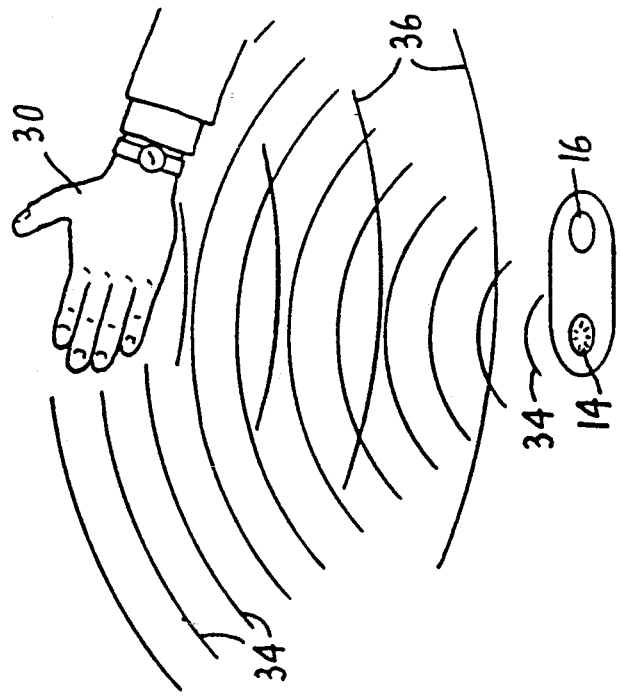
FIG. 1.
FIG. 3.
FIG. 2.

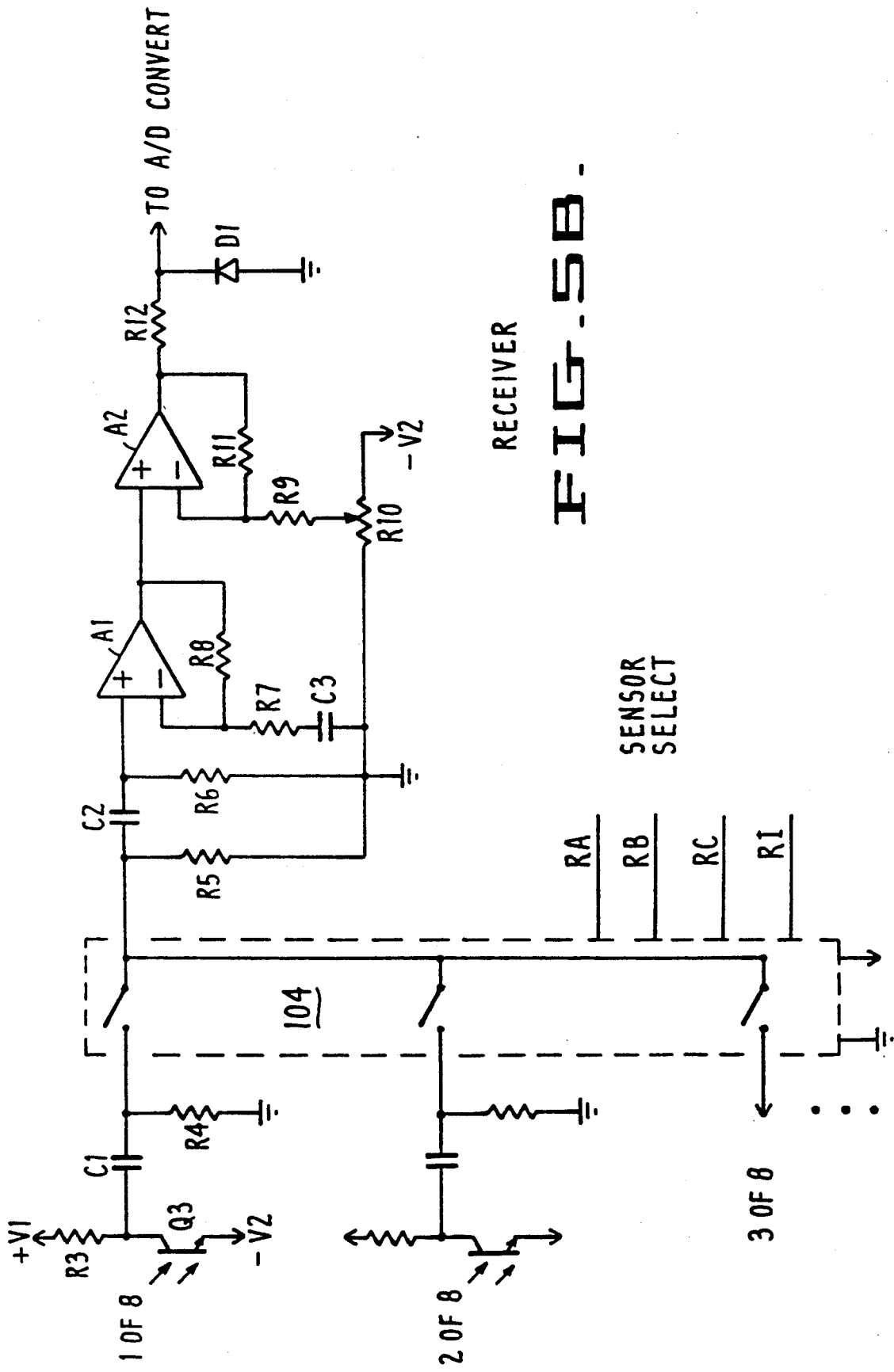
FIG. 5B. RECEIVER

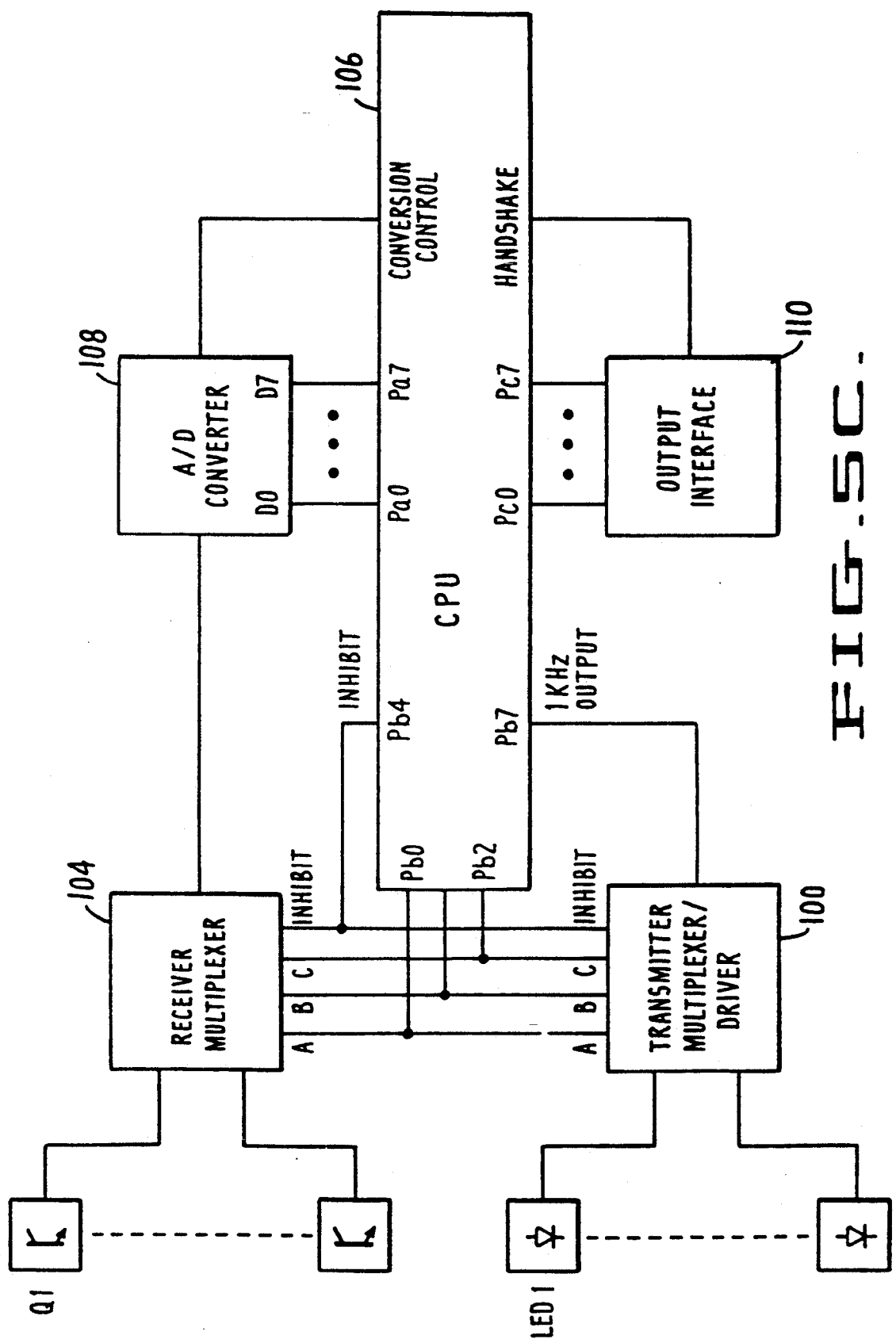

CONTROL INTERFACE APPARATUS

This is a continuation of application Ser. No. 07/258,157 filed Oct. 14, 1988, now abandoned.

A portion of the disclosure of this patent document, an Appendix contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. The material is protected under U.S. Copyright Law by the notice "Copyright Axelrod 1988."

FIELD OF THE INVENTION

This invention relates to the field of a control interface for computer or video game. More particularly, this invention relates to determining the location of an object, such as a human hand, using infrared radiation transmission and reception. The apparatus disclosed and claimed is capable of operating selectively in such a way that location determination can be used to generate not only "threshold" (yes/no) type control signals, but also "analogue" (non-yes/no) type control signals.

BACKGROUND OF THE INVENTION

Controlling the position of a cursor is important when using certain types of machines such as a computer or video games. Cursors have been controlled by keyboard keystrokes. Improved ergonomic interfaces include a joystick, mouse and trackball. Using these devices, a computer operator has a better "feel" for adjusting cursor position relative to control operation. However, each of these devices requires the operator to move a physical object which is hard wired to the machine. Such a practice can be cumbersome or inefficient requiring the operator to retrieve and deposit the object for each use.

There are other non-keyboard devices which must be moved for controlling a cursor. These devices include such means measuring the doppler shift, combining infrared and ultrasonic transceivers, transmitting light from a light pen at the display screen, or affixing a radio transmitter or receiver to the head of the user. Such methods and devices are shown in Baker, et al., in U.S. Pat. No. 4,578,764, King et al., in U.S. Pat. No. 4,565,999, Davison, U.S. Pat. No. 4,682,159, Herrington et al., U.S. Pat. No. 4,645,648, and Mueller et al., U.S. Pat. No. 4,550,250.

Lefkowitz, in U.S. Pat. No. 4,524,348, discloses a cordless control interface between a physical object such as a part of the human body, and a machine. Movement of the physical object in a defined field is sensed, and signals corresponding to such movement are received, detected, amplified and produced as an input signal to the machine to move an element of the machine in the same direction as, and in an amount proportional to, movement of the object. In one embodiment, the machine is a video game system and the element is a display signal.

The Lefkowitz apparatus comprises planar antennas, such as sheets of metal and the antenna is coupled to a detunable oscillator. If a physical object, such as a human hand, is placed into the field of the oscillator, the presence of the hand due to body capacitance is communicated to a tuned circuit in the form of added capacitance to the combination of circuit capacitance causing an alteration in the frequency of the active oscillator. Such alteration is in the form of the lowering the operating frequency. Accordingly, the position of the hand is sensed. By moving the hand, the capacitance changes.

The sensed object is electrically coupled as a capacitance into the circuit of Lefkowitz through one or more antennas. The position of an electrically inert object, having no ability to effect the capacitance of the system, cannot be detected and located. Therefore, electrically inert objects cannot be used to control a cursor using Lefkowitz. In certain applications, such as video or computer games, a player may wish to wield an object, such as a sword, baseball bat or the like, to enhance the realism of play. Where such objects are electrically inert for safety or other reasons the object cannot be sensed.

The oscillations are typically in the radio frequency range. Accordingly, these devices are expensive to manufacture. Further, governmental restrictions are placed upon radio frequency devices requiring adherence to government restrictions.

An ideal cordless cursor control device would merely sense the position of any physical object, for example, the operator's hand without requiring the operator to move an object or requiring the use of expensive radio frequency oscillators. Such a device would be extremely easy for the user to operate. Further, such a device would greatly simplify and enhance the playing of video games.

SUMMARY OF THE INVENTION

This invention comprises a control interface between a machine and a physical object. The invention includes an infrared transmitter for transmitting a first infrared signal to an object. Upon striking the object, the infrared signal is reflected forming a reflected infrared signal. An infrared receiver receives the reflected signal from the object and the reflected signal is transformed into a second signal representative of a distance between the object and the receiver. The second signal, which may be either an analogue type, or a yes/no threshold type, is coupled to the machine. The apparatus is a cordless touch-free controller interface for use with a machine. The present invention is ideally suited for controlling cursor position for use with computers, video games or other display devices.

BRIEF DESCRIPTION OF THE DRAWINGS

FIG. 1 shows a perspective view of one embodiment of the preferred embodiment of the present invention.

FIG. 2 shows a detailed view of a portion of the embodiment of FIG. 1.

FIG. 3 shows a schematic diagram of the embodiment of the invention of FIG. 1.

FIG. 5B is a schematic diagram of the receiver of the preferred embodiment.

FIG. 5C is a block diagram of the preferred embodiment.

DETAILED DESCRIPTION OF THE PREFERRED EMBODIMENT

Figure 4:
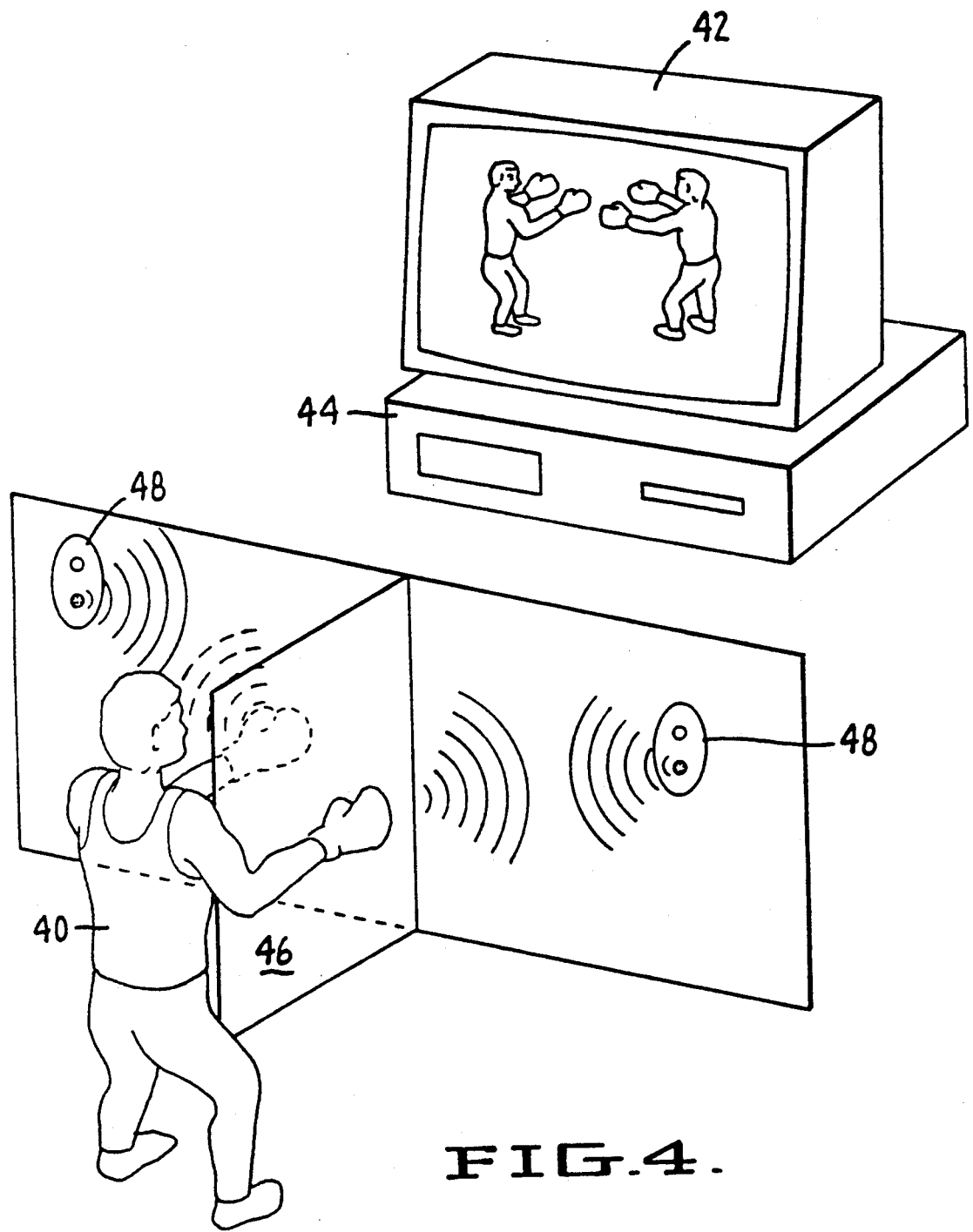
FIG. 4 shows a perspective diagram of an alternate embodiment of the present invention.

FIG. 1 shows a first embodiment of the present invention. A computer device 10 having a display screen 12 is shown. A first infrared transmitter 14 is associated with a first infrared receiver 16 forming an infrared transceiver 18. Similarly, a second infrared transmitter 20 is associated with a second infrared receiver 22 forming an infrared transceiver 24. Each transceiver 18 and 24 is coupled to a control circuit 26. The control circuit 26 is coupled to the computer 10 to control the cursor 28 on the screen 12.

In FIG. 1, the hand of the operator 30 is shown to move first to the left and then in an upward direction. If the computer 10 is operating in a conventional display mode, the cursor will traverse a path on the screen 12 mimicking (illustrated at 32) the path traversed by the movement of the operator's hand.

FIG. 2 shows a more detailed view of the infrared transmitter 14, the infrared receiver 16 and the operator's hand 30. In the preferred embodiment, the transmitter 14 is an infrared light emitting diode (LED) and the receiver 16 is a photo transistor. The receiver 16 could also be a photo diode. In addition, FIG. 2 shows a representation of the transmitted infrared radiation 34 and the reflected radiation 36. The infrared radiation 34 is transmitted from the infrared transmitter 14. The radiation is transmitted in all directions. For certain applications, the transmitted radiation might be columnized using lenses. Some portion of the transmitted radiation 34 will strike the operator's hand 30. That portion of the radiation striking the operator's hand will be reflected, also in all directions.

The strength of radiation is proportional to the distance from the source of the radiation. Accordingly, the amount of radiation received by the infrared receiver 16 is proportional to the distance that the radiation travels from the infrared transmitter 14 to the operator's hand plus the distance from the operator's hand to the infrared receiver 16, i.e., the path of the infrared signal from the transmitter to the receiver. Certain applications may require a radiation shield between the transmitter and receiver to prevent false readings.

The system of FIG. 1 shows transceiver 18 and transceiver 24 mounted into a single line in a planar surface. The distance of the operator's hand from each transceiver represents a location on the computer screen 12. A third transceiver pair could be mounted into the plane of the other two transceivers but not in the same line relative to three dimensional space. In the alternative, the transceivers could be mounted in planar surfaces oriented perpendicular to one another. In such an embodiment the cursor would be controlled by the distance of the object from each planar surface.

FIG. 3 shows two transceivers $T_1$ and $T_2$ mounted in the same plane. To determine the distance of the hand 30 from a plane defined by the transceivers $T_1$ and $T_2$ in an ideal system, the following equations are used.

$$A_n^2 = X_n^2 + d_n^2$$

$$B_n^2 = X_n^2 + (D - d_n)^2$$
$$= X_n^2 + D^2 - 2Dd_n + d_n^2$$
$$A_n^2 - B_n^2 = -D^2 + 2Dd_n$$
$$\therefore d_n = (A_n^2 - B_n^2 + D^2)/2D$$
$$X_n = (A_n^2 - d_n^2)^{\frac{1}{2}}$$
$$= (A_n^2 - ((A_n^2 - B_n^2 + D^2)/2D)^2)^{\frac{1}{2}}$$

$A_n$ is the distance of the hand from the first transceiver $T_1$ measured as a function of the strength of the signal received by the first transceiver.

$B_n$ is the distance of the hand from the second transceiver $T_2$ measured as a function of the strength of the signal received by the second transceiver.

$X_n$ is the distance of the hand from the plane defined by the transceivers $T_1$ and $T_2$.

$d_n$ is the distance from transceiver $T_1$ and the projection of the location of the hand on the plane defined by the transceivers $T_1$ and $T_2$.

D is the distance between transceivers $T_1$ and $T_2$.

EXAMPLE 1

$$d_1 = 1 \approx ((3.16)^2 - (6.71)^2 + 49)/14$$

$$x_1 = 3 \approx ((3.16)^2 - (1)^2)^{\frac{1}{2}}$$

EXAMPLE 2

$$d_2 = 4 \approx ((6.4)^2 - (5.83)^2 + 49)/14$$

$$x_2 = 5 \approx (6.4^2 - 4^2)^{\frac{1}{2}}$$

EXAMPLE 3

$$d_3 = -3 \approx ((6.71)^2 - (11.66)^2 + 49)/14$$

$$x_3 = 6 \approx (6.71)^2 - (-3)^2$$

Using the Pythagorean Theorem, these equations show that both lateral distance along and distance from the surface in which both transceivers are mounted can be measured using these two transceivers, $T_1$ and $T_2$. Referring to FIG. 3, the distance D between the two transceivers is always a constant. The two distances $A_n$ and $B_n$ of a given point from the two transceivers is measured using the relative strength of the signals received at each of the transceivers. Accordingly, we have two equations and two unknowns, $X_n$ and $d_n$. Using a third such transceiver mounted out of the line connecting $T_1$ and $T_2$ one can determine three dimensional spacing for applications requiring such information, such as mechanical CAD design or certain video games.

No system will be ideal. An operator's hand located within the volume of space sensed by the present invention will be represented on the display screen at a particular location. As the operator's hand is moved and positioned in a new location the relative analogue change in position will be displayed on the screen. More precise position identification can be obtained through the use of precision components, infrared lenses and circuitry.

In some applications, the infrared signals from a first transceiver after striking the operator's hand and thereby forming a reflected signal may inadvertently strike a second, unintended transceiver forming a false indication of location. Three possible ways to avoid such a false reading include: 1) having each transceiver operate within a unique segment of the infrared portion of the electromagnetic spectrum, 2) collimate the signals sent and received with optical lenses and 3) alternately pulse each transceiver for a predetermined length of time.

For example, in the embodiment of FIG. 1, each transceiver could be turned on for 100 milliseconds and then turned off for the same length of time. The other transceiver would be turned on when the first transceiver is turned off and vice versa. For three dimensional applications, each transceiver could operate for one-third of the duty cycle. Because infrared radiation travels at the speed of light, approximately 186,000 miles per second, only very short operating cycles are needed to pinpoint the location of the operator's hand with reasonable accuracy. In this way, inexpensive electronic components can be utilized and still maintain high accuracy of cursor control.

In some applications, it may be desirable for a cursor control device to sense the location of more than one object. In the preferred embodiment of the present invention, the cursor control device may be utilized with a Nintendo video game device. Nintendo is a trademark of Nintendo of America, Inc. If for example, the Mike Tyson Punch Out game is used, it may be necessary to sense each of the "boxer's" hands separately. In FIG. 4, the player 40 is positioned in order to see the display 42. The display 42 is controlled in the usual manner by the video game device 44 which in some circumstances may be a personal computer. The display 42 shows, among other things, a caricature of the player as a boxer and an opponent in a boxing ring.

In the Nintendo boxing game, some means must be used to identify a left punch and a right punch, as well as the differences between blows to the face and body jabs. Nintendo sells a controller which requires the player to press buttons or combinations of buttons to signify each such punch. When utilizing the present invention the location of each hand can be uniquely determined by having a screen 46 divide two playing areas each having a transceiver 48. The location of each hand is separately registered by the appropriate transceiver.

When utilizing the present invention with this game, the control circuitry can be set to punch after a particular threshold of reflected signal is received. This signifies that the player's hand is at least as close as some predefined limit to the transceiver. In the event that the player's hand is further from the transceiver than is necessary to achieve the appropriate threshold, no punch is indicated on the game screen. When the player's hand approaches the transceiver sufficiently close that the threshold is crossed, the display screen will then indicate a punch.

The game might be played without a dividing screen should the transceiver be able to differentiate between the player's left and right hands. This might be achieved for example, by having transceivers which are directional. The infrared radiation may be focused with lenses for both transmitter and the receiver to collimate the signal. Each transceiver would only transmit and receive infrared radiation within a sufficiently narrow field of view. This would avoid the problem of having a left punch being misinterpreted as a right punch. The player must take care to avoid moving his or her left hand into the right punch field of view. Accordingly, the apparatus can differentiate between the player's two hands.

Figure 5A:
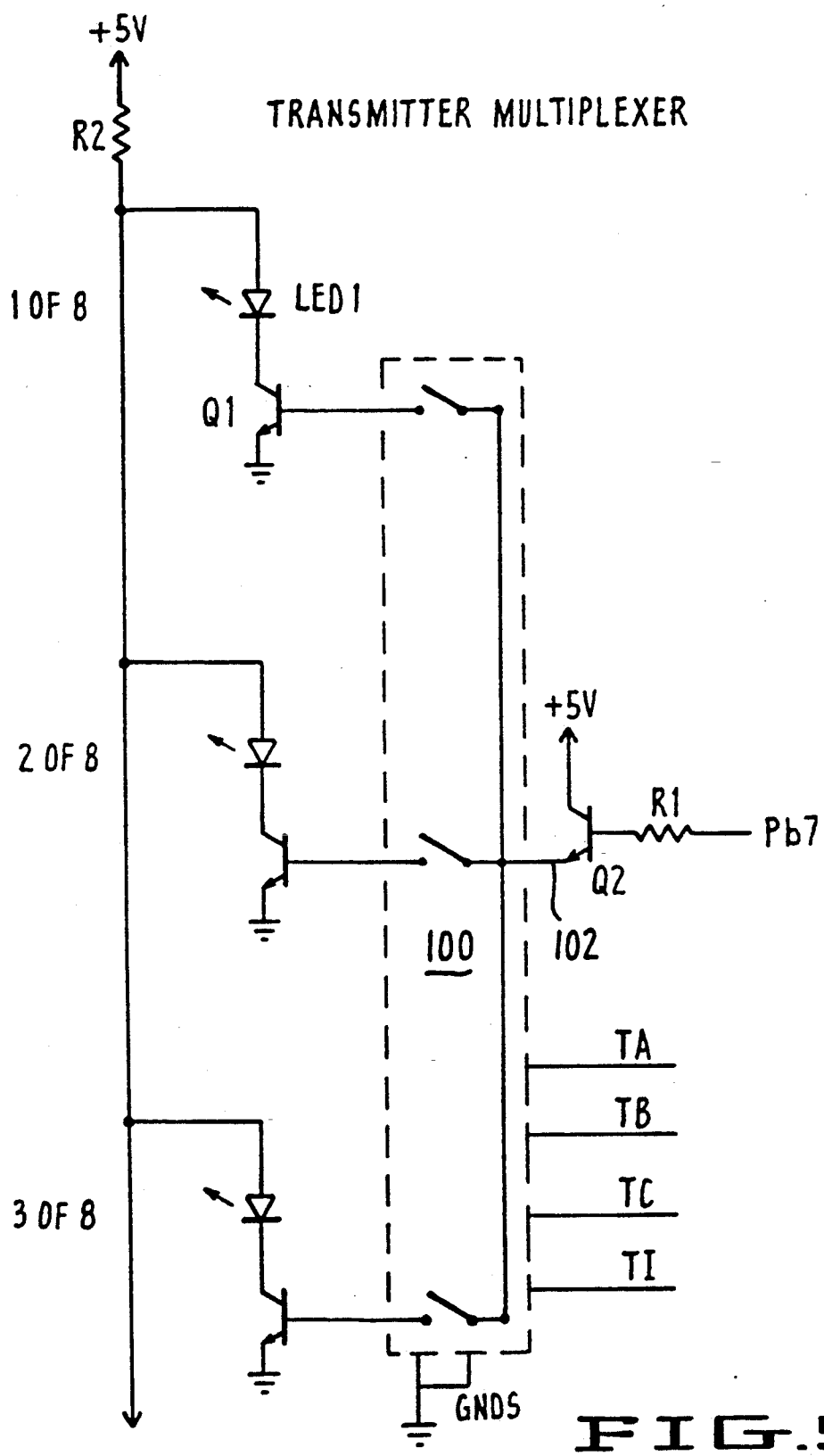
FIG. 5A is a schematic diagram of the transmitter of the preferred embodiment.

FIG. 5A shows a transmitter of the preferred embodiment. The transmitter contains a one of eight multiplexer 100 having three select control lines TA, TB, and TC and an inhibit line TI. The inhibit line disables the multiplexer as necessary. The circuit for each of the eight outputs is preferably the same as each other output circuit; only three of these eight output circuits is shown to avoid unnecessarily complicating this circuit schematic diagram. The control lines are preferable controlled by the CPU shown in FIG. 5C.

The emitter of an input NPN transistor Q2 is coupled to an input port 102. The collector of transistor Q2 is coupled to a positive voltage V and the base of transistor Q2 to a current limiting bias resistor R1. The bias resistor is coupled to any convenient 1 KHz square wave source.

Each of the outputs of the multiplexer 100 is coupled to an appropriate output circuit. Each of the eight output circuits are the same as each other output circuit. The first output of the multiplexer is coupled to the base of an appropriate NPN transistor Q1. The emitter of the transistor Q1 is coupled to ground and the collector to the anode of a infrared light emitting diode LED1. All of the LEDs 1 through 8 are coupled to the positive voltage supply V through a second current limiting bias resistor R2.

The select channels A, B and C singly select one of the eight outputs of the multiplexer 100 to be active. The input transistor Q1 and the selected output transistor Q2 operate together as a Darlington pair to drive the selected light emitting diode LED1.

FIG. 5B shows the receiver circuit of the preferred embodiment. The infrared light received at the receiver strikes an appropriate one of the eight phototransistors Q3. The circuit for each of the eight inputs is preferably the same as each other input circuit; only two of these eight inputs circuits is shown to avoid unnecessarily complicating this circuit schematic diagram. Three control lines to the multiplexer circuit RA, RB and RC select the appropriate one of the eight the input circuits. The control lines are preferable controlled by the CPU shown in FIG. 5C. An inhibit line RI is also supplied to inactivate the receiver multiplexer if necessary.

The emitter of the phototransistor Q3 is coupled to a negative voltage supply $-V2$. The collector of the phototransistor Q3 is coupled to a positive voltage supply V1 through a current limiting bias resistor R3. The collector of the phototransistor Q3 is also coupled to one of the eight inputs of a one of eight multiplexer 104 through a high pass filter formed by a capacitor C1 and a resistor R4 to reduce the low frequency hum and decouple dc offset caused by variations in phototransistor gains. The resistor R4 is coupled between the input of the multiplexer and ground.

The output of the multiplexer 104 is coupled to a resistor R5 which sets the reference point for the gain stages. The resistor R5 is also coupled to ground. The output of the multiplexer is also coupled to a first terminal of capacitor C2. The second terminal of the capacitor C2 is coupled to the positive input of a first operational amplifier A1 and to a first terminal of a resistor R6. The second terminal of the resistor R6 is coupled to ground. The capacitor C2 and the resistor R6 operate as a high pass filter for the positive input of the operational amplifier A1.

The negative input of the operational amplifier A1 is coupled to ground through the series connection of a resistor R7 and a capacitor C3. The negative input of the operational A1 is also coupled to its output through a resistor R8. The output of the operational amplifier A1 is coupled to the positive input of the second operational amplifier A2.

The negative input of the second operational amplifier A2 is coupled to a resistor R9. The other terminal of the resistor R9 is coupled to the sliding terminal of a potentiometer R10. A first fixed terminal of the potentiometer R10 is coupled to ground and the second fixed terminal of the potentiometer is coupled to the negative supply voltage −V2. Accordingly, the appropriate potential can be applied to the negative input of the second operational amplifier A2 through the adjustable voltage divider network of the potentiometer.

The negative input of the second operational amplifier A2 is also coupled to its output through a resistor R11. The output of the second operational amplifier is coupled to an analog to digital converter through as resistor R12. The terminal of the resistor R12 which is not coupled to the second operational amplifier is coupled to the anode of a diode D1. The cathode of the diode D1 is coupled to the circuit ground.

FIG. 5C shows a block diagram of the circuit of the preferred embodiment of the present invention. The transmitter and receiver sections are representational only and it should be understood that the transmitter and receiver are those shown in FIGS. 5A and 5B, respectively. Circuits having similar function and using different components can be designed and still fall within the spirit and scope of the present invention.

The channel select lines A, B and C and the inhibit line for the transmitter and receiver are coupled together and driven by a CPU 106. In the preferred embodiment the CPU is an Apple II. The CPU 106 can also be used to generate the 1 KHz square signal used to drive the selected infrared light emitting diode LED1. The output of the receiver op amp A2 is coupled to an analog to digital converter 108 (A/D converter). The A/D converter 108 forms an eight bit binary representation of the strength of the infrared received by the receiver circuit. That signal is supplied to the CPU 106 through pins Pa0 through Pa7. The CPU can control the A/D converter through the conversion control line as shown.

The CPU operates on these eight bits and supplies the appropriate information to the output interface 110 in order to control the display (not shown). The CPU 106 can control the output interface through the handshake line as shown.

The attached Appendix contains a copyrighted computer program. This computer program can be used by an Apple II to control the circuit of the preferred embodiment to interface with a Nintendo video game system.

Figure 6C:
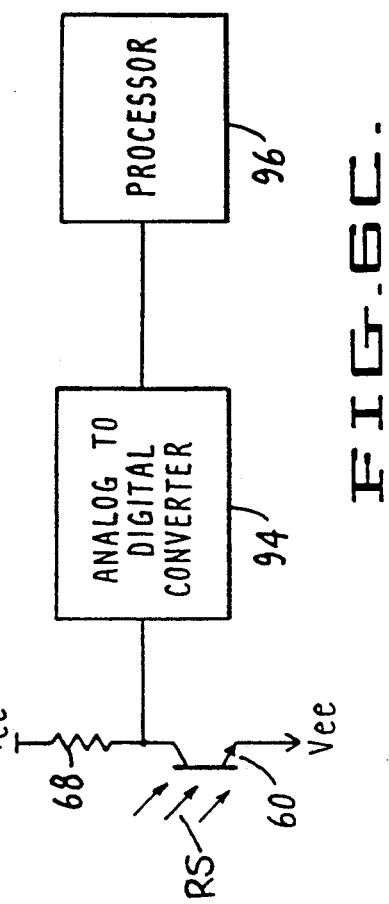
FIG. 6C is a block diagram of a second alternate embodiment of the receiver circuit.
Figure 6A:
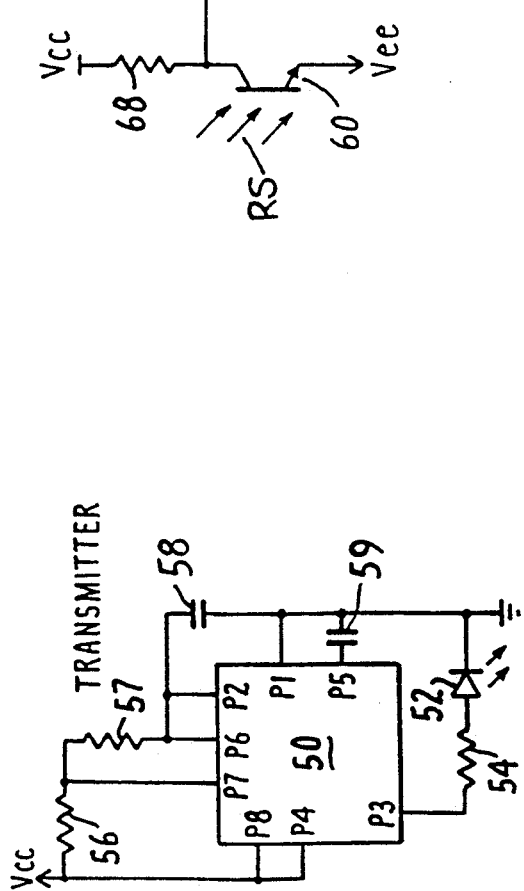
FIG. 6A is a schematic diagram of the transmitter of an alternate embodiment of the present invention.

FIG. 6A shows a circuit schematic of the transmitter of an alternate embodiment of the present invention. A clocking circuit 50 operates to drive an infrared LED 52 which has its negative terminal grounded. The LED 52 is loaded by resistor 54. In the preferred embodiment the clock circuit 50 is an LM555 having eight input contact pins P1 through P8. The transmitter circuit also has a power supply Vcc and a circuit ground. Pin P8 and P4 are coupled to Vcc. Pin P1 is coupled to ground. Pin P7 is coupled to pins P8 and P6 through resistors 56 and 57, respectively. Pin P1 is coupled to pins P2 and P5 through capacitors 58 and 59, respectively. Pin P3 is coupled to the load resistor 54 which in turn is coupled to the positive terminal of the LED 52.

Figure 6B:
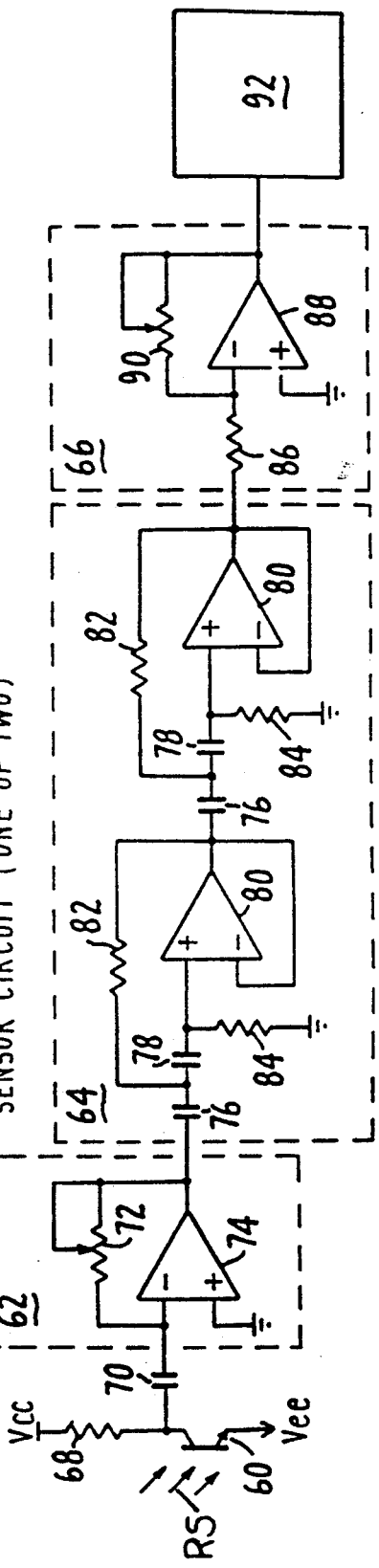
FIG. 6B is a schematic diagram of the receiver of an alternate embodiment.
Figure 7A:
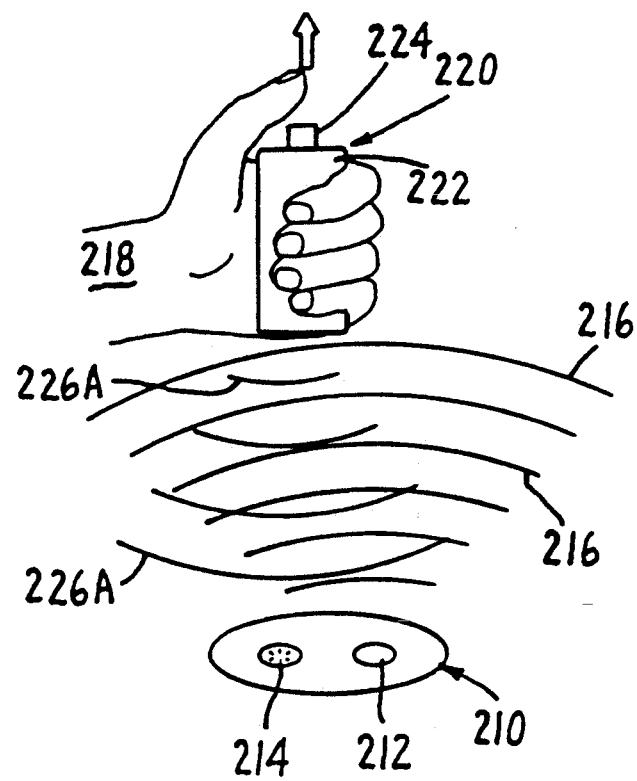
Figure 7B:
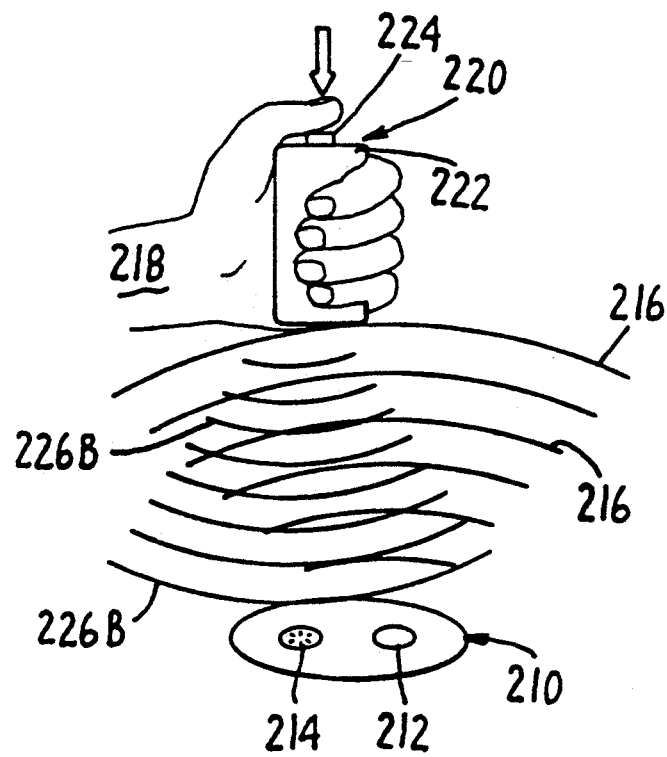
Figure 8A:
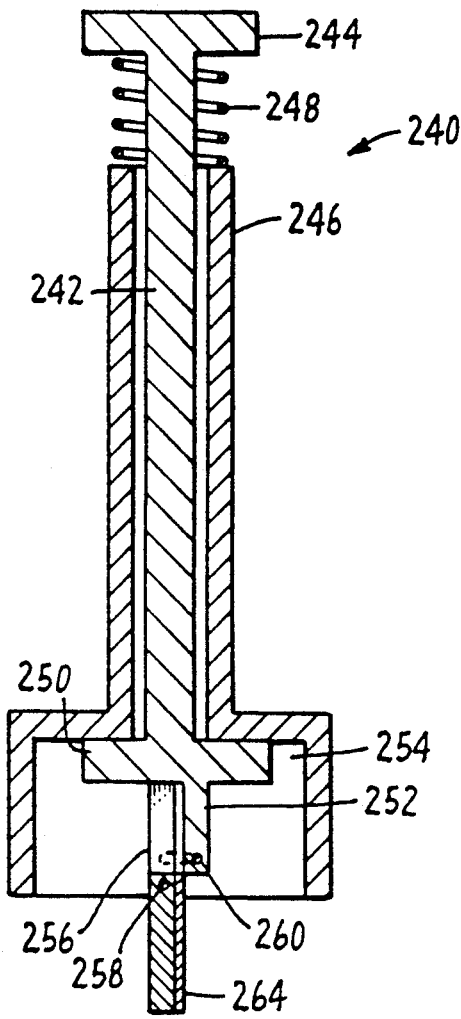
Figure 8C:
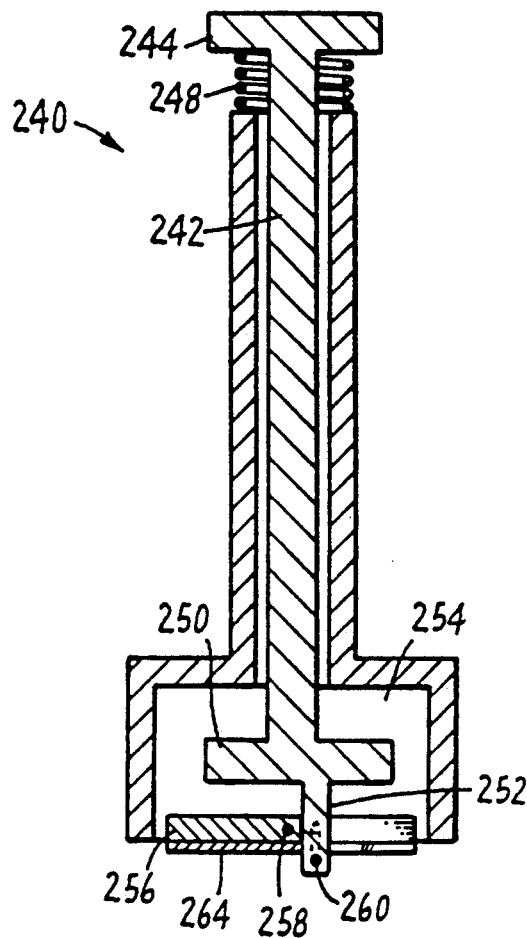
Figure 8B:
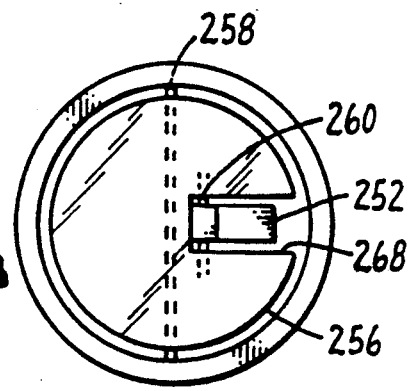
Figure 9:
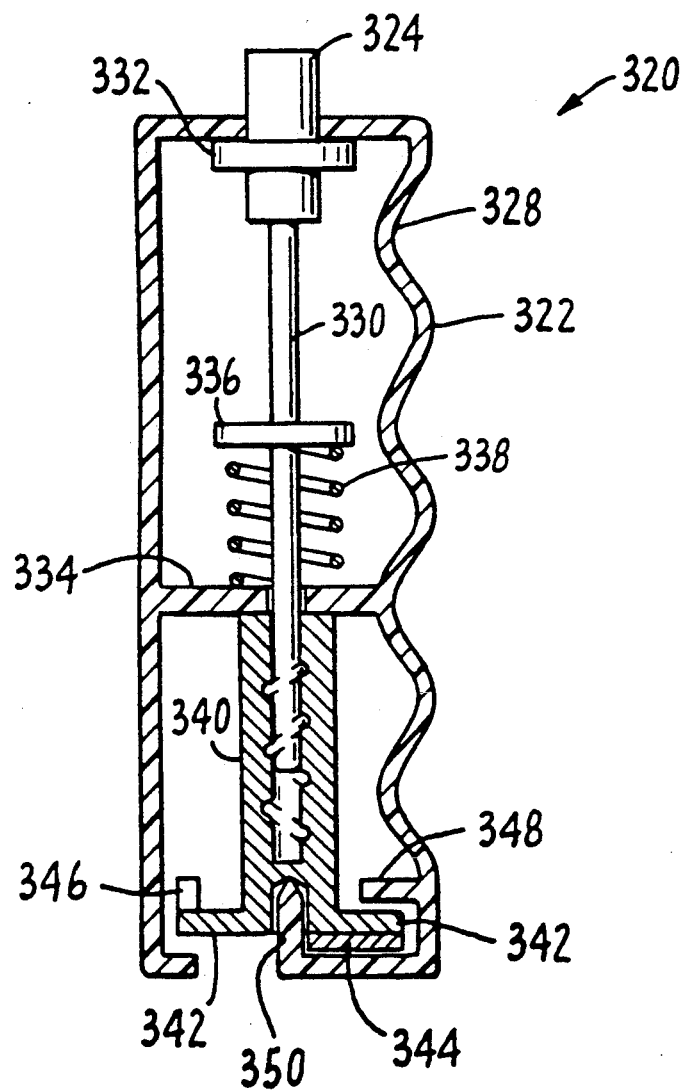

FIG. 6B shows a circuit schematic of the receiver of an alternate embodiment of the present invention. A reflected infrared signal 58 impinges on a phototransistor 60. The transistor is coupled to and biased by power supplies $V_{cc}$, coupled to the collector, and $V_{ee}$, coupled to the emitter. In certain circumstances it may be desireable to replace the phototransistor 60 with a photodiode. The phototransistor 60 may be loaded by a resistor 68.

The signal is ac coupled to the amplifier circuit 62 by the capacitor 70. The ac coupling can eliminate dc shift which can occur from ambient light such as sunlight or artificial room light. In this way only the signal resulting from the reflected signal will be amplified.

The signal developed by the phototransistor 60 is amplified in the amplifier circuit 62. The amplifier circuit includes a feedback resistor 72 and an operational amplifier 74 (op amp). The feedback resistor 72 may be a variable resistor. The resistor 72 is coupled between the output and the negative input of the op amp 74. The coupling capacitor 70 is coupled between the collector of the phototransistor 60 and the negative input of the op amp 74.

The signal is then filtered in high pass filter 64 which eliminates power line noise, hum and other interference. In the preferred embodiment, the filter includes two identical stages. The amplified signal from the amplifier circuit is applied to an filter input capacitor 76. A second filter capacitor 78 is coupled between the filter input capacitor 76 and the positive input of an op amp 80. A feedback resistor 82 is coupled between the output of the op amp 80 and the node coupling the filter input capacitor 76 and the second filter capacitor 78. A biasing resistor 84 is coupled between the positive input of the op amp 80 and ground. The negative input and the output of the op amp 80 are coupled together. A second similar filter may be used, as shown, to further remove unwanted line noise.

In some applications it may be desired to amplify the signal after filtering out the noise. The second amplifier circuit 66 has an input resistor 86 coupled to the negative input of the op amp 88. A feedback resistor 90 is coupled between the output and the negative of the op amp 88. The feedback resistor 90 may be variable to adjust the gain of the amplifier circuit 66. The positive input of the op amp 88 is coupled to ground.

The amplified signal is then applied to a comparator circuit 92 to determine the strength of the received signal. The output of the comparator 92 may be applied to a computer to be analyzed in controlling the cursor. An analog to digital circuit may be substituted for the comparator. Two or three of these circuits can be used to pinpoint a physical object in two or three dimensional space, respectively, for cursor control representing these dimensions.

In the alternative, the signal received by the phototransistor 60 can be directly applied to an analog to digital converter 94 as shown in FIG. 6C. The output of the analog to digital converter 94 is applied to a processor 96 which can digitally remove extraneous spurious signals and operate on the desired signal as necessary for the particular application. The processor 96 can be any commercially available processor such as a personal computer, video game or microprocessor chip.

The present invention has been described relative to specific embodiments. The system described herein clearly has a great deal of operational versatility. It can be used to effect not only a threshold (yes/no) type response (control signal), but also a gradient, analogue type response (control signal). Put another way, with the responded-to object producing reflected infrared above a certain level, or above different selected, specific levels, a related response is threshold "triggerable". In addition, responsive activity can "analogue-track" with the real-time, actual, reflected infrared level. Accordingly, response activity can range from a simple, single-mode characteristic to different, more complex, multiple-mode characteristics.

It will thus be clear to persons of ordinary skill in the art that the present invention may be utilized in a variety of applications. Modifications which become apparent to persons skilled in the art after reading this patent are deemed within the scope of the present invention.

What is claimed is:

1. A method by which a person may play a video game, the method comprising:
    transmitting infrared radiation from a radiation transmitter to create a detection field;
    providing a radiation receiver which has a fixed position relative to the radiation transmitter and this position being one where the receiver can detect reflections of the infrared radiation;
    moving at least a part of the person to a position within the detection field thereby causing infrared radiation to reflect off of the part of the person within the detection field toward the receiver;
    receiving radiation reflected from the part of the person within the detection field by the radiation receiver;
    determining the strength of the radiation reflected from the part of the person within the detection field;
    triggering an action in the game when the strength of the reflected radiation is above a predetermined threshold.

2. The method of claim 1 further comprising the step of depicting the action on a visual display.

3. A video game apparatus which allows a user to play a video game without touching the apparatus, comprising:
    an infrared radiation transmitter for outwardly transmitting radiation to create a detection field into which the user may put at least a part or extension of the user's body;
    a radiation receiver which has a fixed position relative to the radiation transmitter for receiving a reflection of the outwardly transmitted radiation that creates a detection field from the part or extension of the user within the detection field, and for producing a signal corresponding to the strength of the received reflection; and
    a processor, operably associated with the radiation receiver, for triggering at least one predetermined action in the game when the signal corresponding to the strength of the reflected radiation is above a predetermined threshold.

4. The apparatus of claim 3 where the infrared radiation transmitter is an infrared light emitting diode.

5. The apparatus of claim 3 where the radiation receiver comprises a photo-transistor.

6. The apparatus of claim 3 where the signal is an analog signal.

7. The apparatus of claim 3 where the signal is a digital signal.

8. The apparatus of claim 3 where the radiation receiver may produce additional signals corresponding to changes in the strength of the received reflection.

9. The apparatus of claim 8 where the additional signals trigger additional predetermined actions in the game.

10. The apparatus of claim 3 further comprising:
    a second infrared radiation transmitter for outwardly transmitting radiation to create a second detection field into which the user also may put at least a part or extension of the user's body; and
    a second radiation receiver, operably associated with the second radiation transmitter, for receiving a reflection of the outwardly transmitted radiation that creates the second detection field from the part or extension of the user that is within the second detection field, and for producing a second signal corresponding to the strength of the received reflection;
    where the processor may trigger at least one additional predetermined action in the game corresponding to the second signal.

11. The apparatus of claim 10 where the second radiation receiver has a fixed position relative to the second radiation transmitter.

12. The apparatus of claim 11 where the radiation transmitter and radiation receiver are positioned in a generally linear array and where the second radiation transmitter and second radiation receiver are also positioned in a generally linear array.

13. The apparatus of claim 3 where the radiation transmitter and the radiation receiver are positioned in a generally linear array.

* * * * *